United States Patent [19]
Babitch

[11] Patent Number: 5,347,286
[45] Date of Patent: Sep. 13, 1994

[54] AUTOMATIC ANTENNA POINTING SYSTEM BASED ON GLOBAL POSITIONING SYSTEM (GPS) ATTITUDE INFORMATION

[75] Inventor: Daniel Babitch, San Jose, Calif.

[73] Assignee: Trimble Navigation Limited, Sunnyvale, Calif.

[21] Appl. No.: 33,953

[22] Filed: Mar. 19, 1993

Related U.S. Application Data

[63] Continuation of Ser. No. 835,187, Feb. 13, 1992, abandoned.

[51] Int. Cl.$^5$ .................... H01Q 3/00; H01Q 21/00; H04B 7/185; G01S 5/02
[52] U.S. Cl. .................... 342/359; 342/352; 342/424; 343/725; 343/757
[58] Field of Search .............. 342/359, 424, 423, 422, 342/56, 74, 75, 76, 77, 367; 343/757, 725

[56] References Cited

U.S. PATENT DOCUMENTS

| | | | |
|---|---|---|---|
| 3,148,369 | 9/1964 | Zable et al. | 342/423 |
| 3,568,204 | 3/1971 | Blaisdell | 343/725 |
| 3,772,701 | 11/1973 | Wilkinson | 343/100 CS |
| 4,232,313 | 11/1980 | Fleishman | 343/6 R |
| 4,384,293 | 5/1983 | Deem et al. | 342/352 |
| 4,418,350 | 11/1983 | Rosen | 343/359 |
| 4,599,620 | 7/1986 | Evans | 342/357 |
| 4,644,358 | 2/1987 | Sekine | 342/356 |
| 4,725,843 | 2/1988 | Suzuki et al. | 342/359 |
| 4,741,245 | 5/1988 | Malone | 89/41.03 |
| 4,796,032 | 1/1989 | Sakurai et al. | 342/359 |
| 4,812,991 | 3/1989 | Hatch | 364/458 |
| 4,870,422 | 9/1989 | Counselman, III | 342/357 |
| 4,881,080 | 11/1989 | Jablonski | 342/357 |
| 4,949,089 | 8/1990 | Ruszkowski | 342/52 |
| 4,954,833 | 9/1990 | Evans et al. | 342/357 |
| 4,963,889 | 10/1990 | Hatch | 342/357 |
| 4,990,922 | 2/1991 | Young et al. | 342/52 |
| 4,994,812 | 2/1991 | Uematsu et al. | 342/359 |
| 5,019,833 | 5/1991 | Nonaka | 343/840 |
| 5,021,792 | 6/1991 | Hwang | 342/357 |
| 5,077,557 | 12/1991 | Ingensand | 342/352 |

OTHER PUBLICATIONS

Ron Hatch, "Instantaneous Ambiguity Resolution," paper presented at KIS Symp., Banff Canada Sep. 1990.
Ron Hatch, "Ambiguity Resolution in the Fast Lane," Proc. 2d Int. Tech. Mtg. Inst. Nav. Sat. Div. '89, pp. 45–50.
Burgett, et al., "The Devel. and Apps. of GPS Determined Attitude," paper for NTC '83, Nov. 1983.

(List continued on next page.)

*Primary Examiner*—Gregory C. Issing
*Attorney, Agent, or Firm*—Thomas E. Schatzel

[57] ABSTRACT

An embodiment of the present invention is a system for automatically pointing a directional antenna. The system comprises two GPS antennas mounted at horizontally opposed extremities of the directional antenna, the placement is such that the GPS antennas lie on a line having a normal vector approximately parallel to a boresight of the directional antenna. The outputs from the GPS antennas are downconverted to a measurement frequency and differentially phase compared for each of a plurality of radio visible GPS satellites. A measurement controller that receives the phase comparisons. A navigation computer receives measurements from the measurement controller and uses a microprocessor to calculate the GPS latitude and longitude and the attitude angles of the pair of GPS antennas. A servo points the directional antenna at a particular target communications satellite, based on the computed azimuth, elevation, latitude, and longitude, as provided by the navigation computer. One of these servos is used to move the GPS antennas in roughly a circle to average out multipath effects to improve accuracy and to reduce integer ambiguities.

10 Claims, 5 Drawing Sheets

OTHER PUBLICATIONS

Cohen and Parkinson, "Mitigating Multipath in GPS Based Attitude Determination", paper at 14th AAS Guidance and Control Conference, Feb. 2-6, 1991, Keystone, Colo.

Ron Brown, "A GPS Receiver with Built-In Precision Pointing Capability," paper at the IEEE Position Location and Navigation Symposium (PLANS '90) Las Vegas, Nev. Mar. 90.

Rath and Ward, "Attitude Estimation Using GPS," ION National Technical Meeting, San Mateo, Calif. Jan. 1989.

Nesbo and Canter, "GPS Attitude Determination for Navigation," *GPS World*, Sep./Oct. 1990, pp. 36-41.

Patrick Hwang, "A Near-Instantaneous Initialization Method for Attitude Determination," Inst. Nav. Proc. Ntl. Tech. Mtg. Colorado Springs, Colo. Sep. 19-21, 1990, pp. 661-669.

Ferguson et al., "Three-Dimensional Attitude Determination with the Ashtech 3DF 24-Channel GPS Measurement System," paper at Institute of Navigation (ION), National Technical Meeting, Phoenix, Ariz., Jan. 22, 1991.

Keierleber et al., "Attitude Determination for Space Transfer Vehicles Using GPS," Inst. Nav. Proc. Ntl. Tech. Mtg. Phoenix, Ariz. Jan. 22-24, 1991.

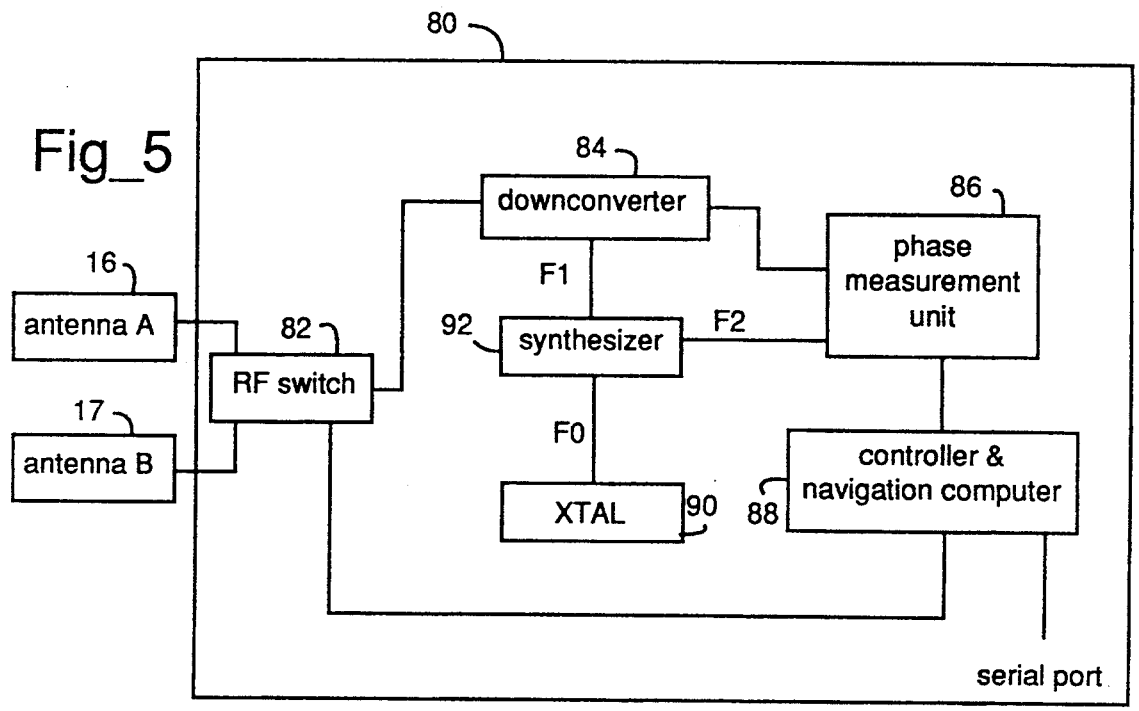
Fig_5
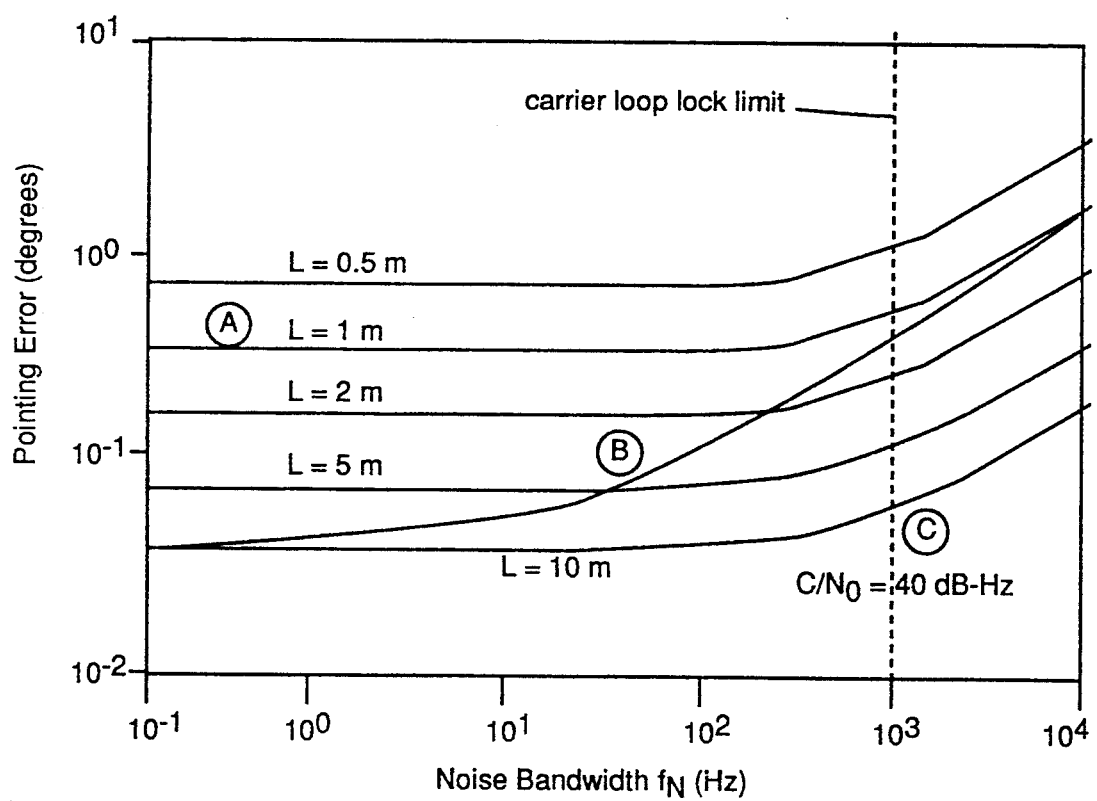
Fig_1

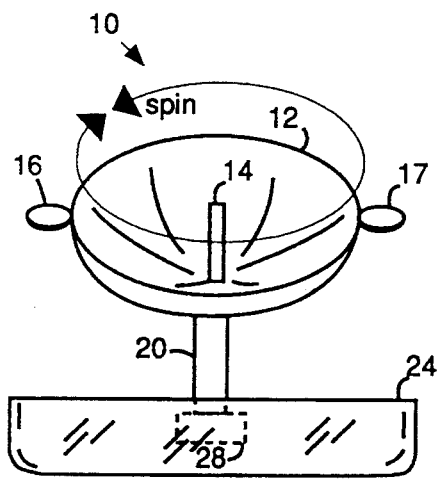
Fig_2A
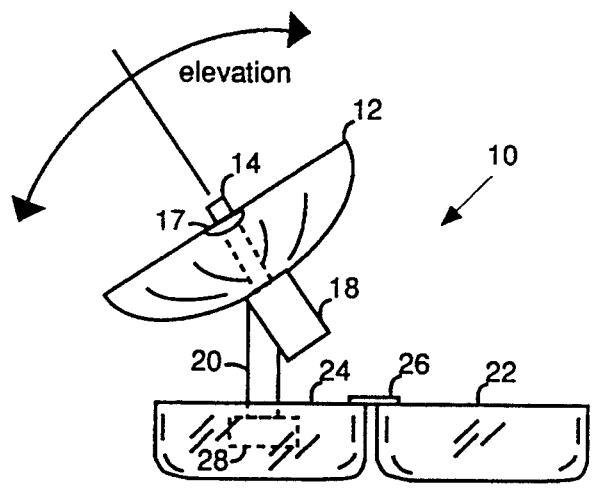
Fig_2B
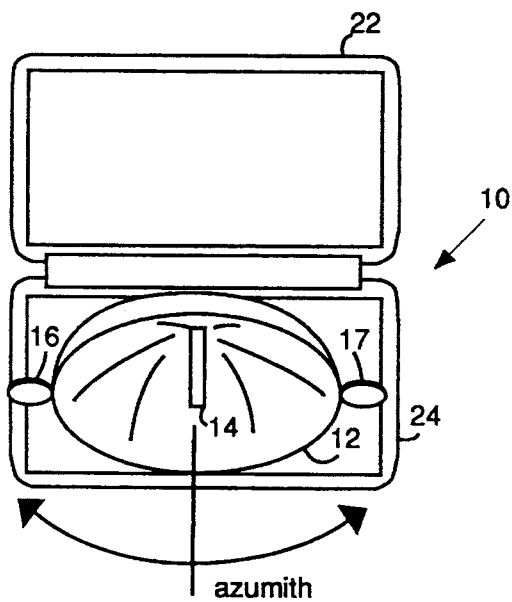
Fig_2C
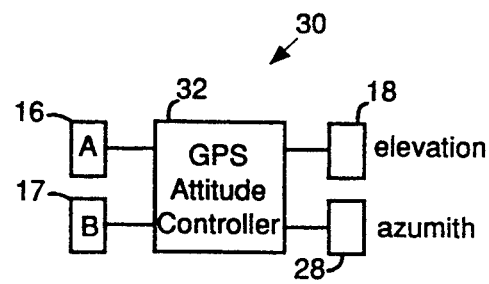
Fig_3
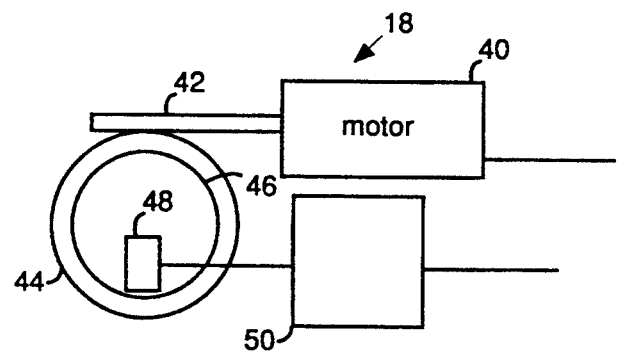
Fig_4

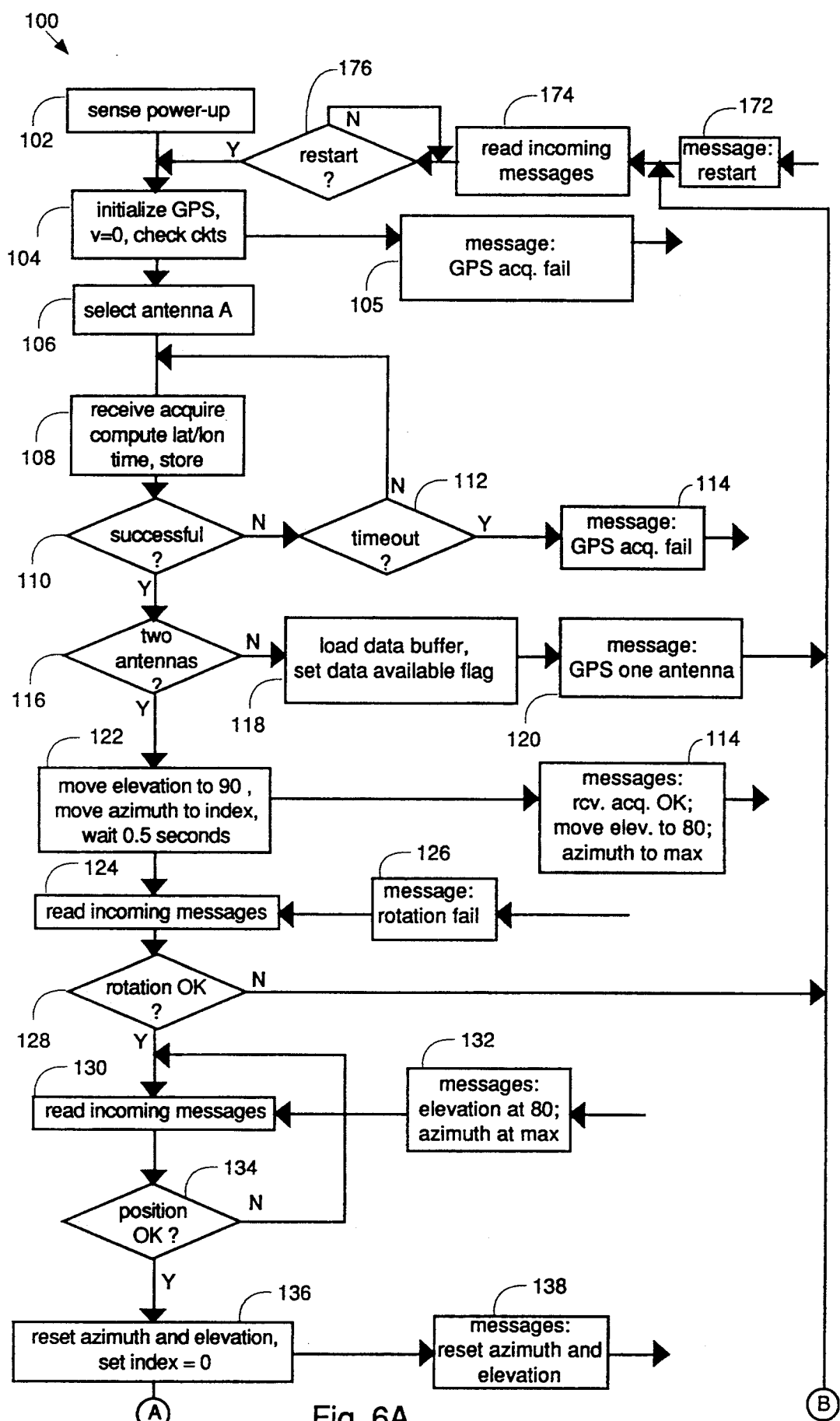
Fig_6A

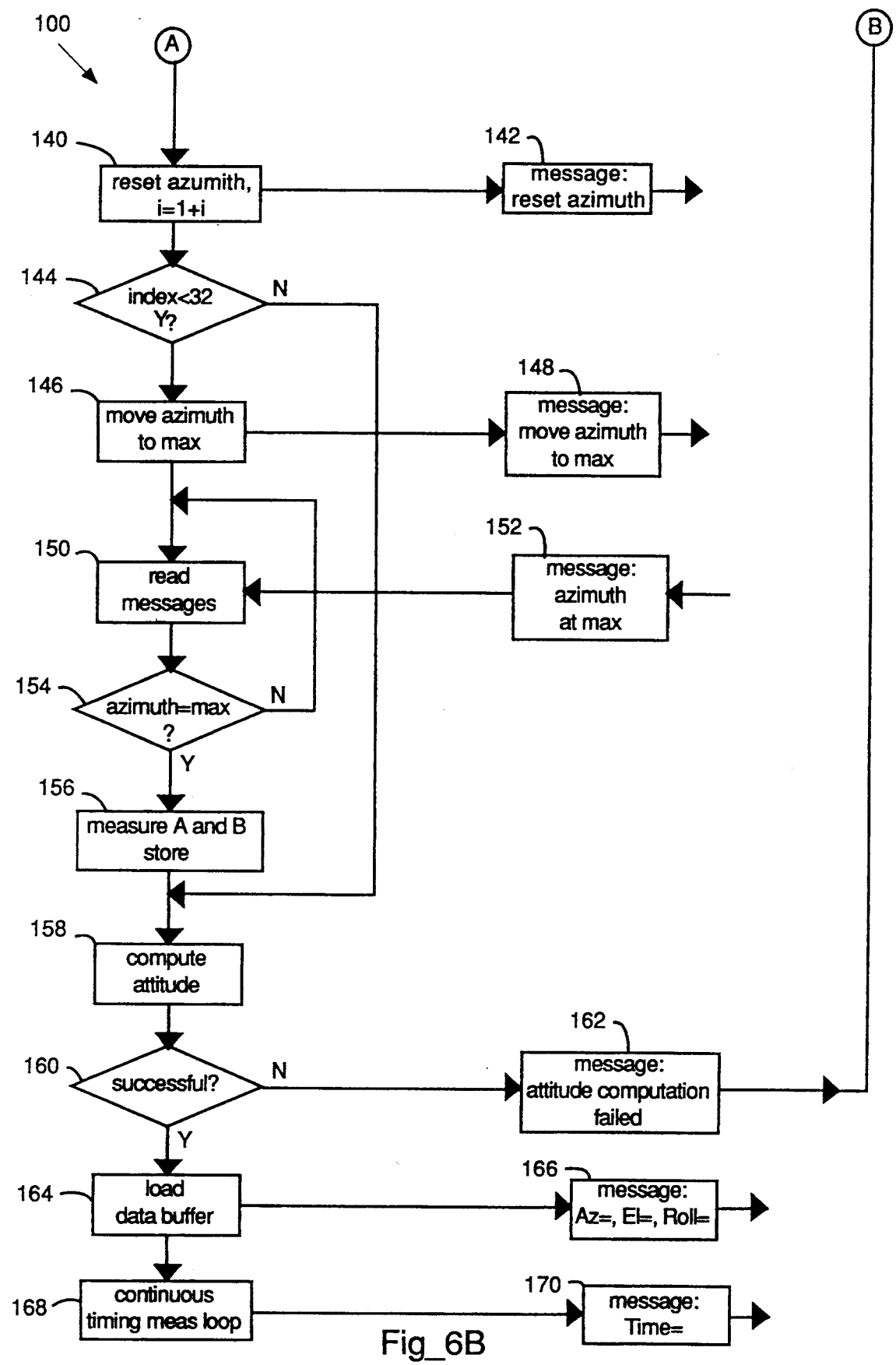
Fig_6B

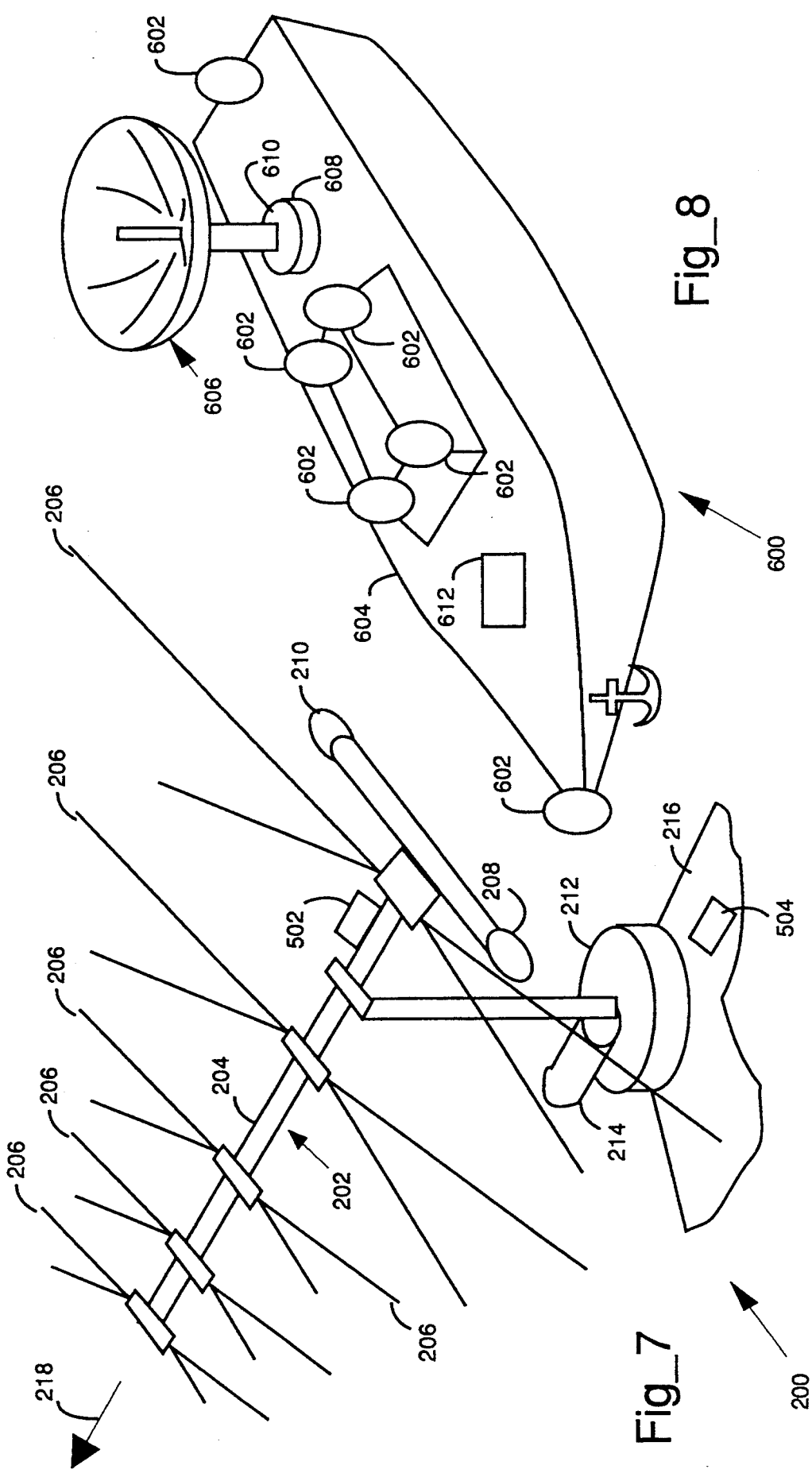

AUTOMATIC ANTENNA POINTING SYSTEM BASED ON GLOBAL POSITIONING SYSTEM (GPS) ATTITUDE INFORMATION

This is a continuation of copending application Ser. No. 07/835,187, filed on Feb. 13, 1992, now abandoned.

BACKGROUND OF THE INVENTION

1. Field of the Invention

The invention relates generally to antenna pointing systems and more specifically to using elements of the global positioning system (GPS) to provide azimuth and elevation information so that a directional antenna can be quickly and accurately pointed at its intended target location.

2. Description of the Prior Art

During the recent war with Iraq, many people saw Peter Arnet of CNN file live reports from Bagdad, Iraq, by a mobile telephone that directly accesses an orbiting communications satellite. Very often, a small parabolic dish antenna could be seen that had been set up behind Mr. Arnet. The initial set up and positioning of such antennas is a tedious and time consuming job. In some situations, such as news reporting, very little time is available.

Dish antennas work at very high frequencies and the dish reflects signals in a very narrow beam, much like a search light reflector. The beam is very narrow, and to communicate with a satellite, the dish has to be positioned within a few degrees. Since orbiting satellites are for all practical purposes invisible to the naked eye from the ground, it is not possible to aim a dish by sight. If the location of the dish and satellite are known, however, it is possible to set the azimuth and elevation of the dish so that it points right. But good three-dimensional attitude information is difficult to achieve, compasses and levels are simply not accurate enough.

Other antenna types which have high directionality have the same problem of accurate pointing to a target which cannot be seen.

Using GPS for Determining Azimuth and Elevation

The United States Department of Defense has placed in orbit a group of satellites, as part of a Global Positioning System (GPS), that can be used by civilians and the military alike to get automated and highly-accurate earth position coordinates on easy to read digital displays. Determining where you are has been a particular problem for seafarers for thousands of years. Now, GPS enables small sailboat owners and even combat soldiers to get their positions to within several meters using handheld portable equipment. GPS can also be used to determine attitude, meaning the direction of pointing.

(A large part of the following background has been taken from a paper titled "Expanding the Performance Envelope of GPS-Based Attitude Determination," by Clark E. Cohen and Bradford W. Parkinson, as published in ION GPS, Albuquerque, N. Mex., Sept. 9-13, 1991).

GPS-based attitude determination offers significant cost savings in applications where inertial guidance has traditionally been the standard approach. Attitude is measured by differential measurements of GPS carrier phase between two or more antennas. Performance may be characterized in terms of accuracy and bandwidth, both being dependant on applications specific parameters, such as the antenna spacing and the carrier-to-noise ratio.

Factors which limit performance are multipath, carrier-to-noise ratio, and integer resolution. Techniques are available for working around multipath and increasing the bandwidth of differential carrier phase tracking. A family of new "Eigenaxis" methods for resolving the integer ambiguities can be used. Real-time processing techniques make possible survey-level accuracy attitude determinations in high dynamic applications (such as high performance jet aircraft), based exclusively on GPS.

Accuracy and Multipath

By far the largest impediment to accuracy of carrier phase measurements is multipath signal interference. At least four approaches are useful for multipath:

rejecting multipath with antenna pattern shaping;
diluting multipath with larger antenna separation;
calibrating out repeatable multipath; and
filtering out multipath in static environments.

Each has its place and advantages, as discussed below. Filtering or averaging out multipath is also possible, even though not discussed in detail here.

Antenna Pattern Shaping

An antenna usually receives a direct ray from a GPS satellite. Unwanted reflections, resulting in multipath signals with longer transit times, are ideally attenuated by the antenna's insensitivity to signals coming from other directions. Carrier phase measurements can indirectly measure the direction of origin of the incident wave fronts from a GPS satellite. A direct, unobstructed line-of-sight between a satellite and an antennas is needed. This kind of spatial filtering is practical in many application environments. Antenna pattern shaping can include polarization parameters, depending on the composition of the reflective materials.

In practice, it is very difficult to build a sharp cutoff in an antenna pattern. Pattern shapes are governed by the Fourier transform relationship between the far field pattern P (n,m) and the aperture distribution $E(\xi,\eta)$ of the antenna:

$$P(n, m) = \int_{-\infty}^{\infty} \int_{-\infty}^{\infty} E(\xi, \eta) e^{-j2\pi(m\xi+n\eta)} d\xi d\eta.$$

Most antennas have a slow cutoff, an angle near the horizon only aggravates multipath for incident rays that typically come from low elevations.

The measured phase is the sum of a direct phase and a resultant of all the reflected rays received by an antenna. The relative amplitude attenuation for the multipath error is roughly the square root of the relative antenna gain between the direct and reflected rays.

Antenna pattern shaping influences multipath rejection plots of L1 carrier amplitude versus time for two antennas of different directivity, with a satellite that passes within five degrees of zenith. The signal strength from an antenna is just as effective an indicator of multipath sensitivity as differential phase.

Increasing Baseline Length

The antenna separation can be used to increase accuracy. The angular pointing error dx is given in terms of the relative ranging error $\sigma_\theta$ and the baseline length L as $$\sigma_\theta = \frac{\sigma_\theta}{L}.$$

Even with standard omni-directional patch antennas in difficult multipath environments (relative range errors up to 5 mm RMS), antenna separation on the order of meters is sufficient to get pointing accuracies in the milliradian level.

Increasing the baseline length compounds two problems, integer ambiguity resolution and differential phase tracking. The number of integer combinations compatible with a given set of differential phase measurements grows rapidly with baseline length. Furthermore, the change in differential phase due to an angular change in attitude grows in sensitivity with baseline length. Therefore tracking fast movements becomes more difficult.

Integer ambiguity resolution is discussed below. The problem of rapid changes in differential phase may be solved by tracking differential phase through feedback, see below. The two problems are related, tracking integer wraparounds in the loop greatly simplifies the process of both initially resolving the integers, and holding on to them once they are determined.

Multipath Calibration

In many applications, especially in aerospace, the multipath environments are highly repeatable. This is demonstrated in the difference between two sets of differential phase data measured exactly two days apart as a GPS satellite traverses the same arc across the sky. The repeatability between the multipath signatures is a fraction of a millimeter RMS. Cohen and Parkinson have shown that in repeatable environments it is possible to calibrate out the effects of multipath and to recover the inherent sub-millimeter accuracy of the GPS signal, in real-time.

Integer Ambiguity Resolution

Integer resolution is a significant performance issue for attitude determination. It is clear that for attitude determination with GPS to be viable, the integers must be resolvable quickly and reliably under all conditions.

An important element of attitude determination is the separation between translational and rotational degrees of freedom. The choice of a reference point on a platform can be completely arbitrary, if kinematic considerations alone govern the separation of translation and attitude. Platform translation can be effectively removed from a differential measurement.

For example, a platform with a single baseline can be constructed from two antennas, a master and a slave. Without any loss of generality, a location of the master antenna may be chosen as a fixed reference point. The possible positions of the slave antenna are constrained to lie on the surface of a virtual sphere of a radius equal to the baseline length.

There are numerous methods for resolving integer ambiguities including integer searches, multiple antennas, multiple GPS observables, motion-based approaches, and external aiding.

Although search techniques work well for smaller baselines (on the order of a couple of carrier wavelengths) they often require significant computation time and are vulnerable to erroneous solutions when longer baselines are used or when fewer satellites are visible. Reliability improves considerably as more antennas are added. Carried to an extreme, a phased array would result whereby the integers would be completely unambiguous and searching would be unnecessary. The question is, how many antennas are required to quickly and unambiguously resolve the integers, even in the presence of noise?

One method for integer resolution is to make use of the other observables that modulate the GPS timer. Pseudo-random code can be used as a coarse indicator of differential range, although it is much more susceptible to multipath problems. Differentiating carriers L1 and L2 provides a longer effective wavelength, and reduces the search space. However, dual frequency receivers are expensive because they are more complicated.

Motion-based integer resolution algorithms make use of additional information provided by platform or satellite motion. A key advantage is that few antennas are required to resolve the integers unambiguously. The following section describes a new set of such motion-based methods.

Eigenaxis Integer Resolution Methods

An abundance of information which is useful in integer resolution comes from the attitude motion of the platform itself. With an appropriate antenna configuration, only a little platform motion is required (even if $L>>A$). Some motion-based techniques have already been reported in the literature. A set of mathematical methods, below, are useful in reducing raw phase measurements into integer biases, rapidly and accurately, based on only a small angle of motion. These methods are grouped together as "eigenaxis," because they all find a unique axis in space that reveals the platform attitude and, thus, the integer ambiguities.

Mathematically, the antenna geometry constraints may be handled by reducing the attitude parameterization to a function of three independent variables (such as azimuth, pitch, and roll). An alternate formulation, treats baselines as Cartesian vectors subject to length and relative orientation constraints.

The measured differential phase (relative satellite range) $\Delta r$ (measured in wavelengths) is proportional to the projection of the baseline vector x (measured in wavelengths) into the line of sight unit vector to the satellite s for a baseline i and a satellite j:

$$\Delta r_{ij} = s_j^T x_i - k_{ij} + b_i + \text{noise}$$

The measurement $\Delta r$ is subject to all additive line bias b ($0 \leq b \leq 1$) all integer ambiguity k and measurement noise. This relationship may be expressed in compact vector and matrix notation for the n satellites in view:

$$\Delta r_i = Sx_i - k_i + b_i + noise$$

The line bias "b" is still a scalar, since it is assumed that there are no inter-channel biases.

Given a favorable PDOP only three satellites are required to determine the relative location of slave antenna undergoing motion. This is one fewer than the four satellites required for kinematic survey since the differencing operation between antennas is performed immediately against the common oscillator in the receiver hardware.

Suppose a baseline moves by a small angle from Cartesian Position $X_0$ to x. It is assumed that the platform angular motion is very much faster than that of the satellite line-of-sight vectors. The measured change in differential phase is given by:

$$\Delta r - \Delta r_0 S(c - x_0) = S dx.$$

Since the line bias and integer ambiguity cancel out of the above expression one can solve for the vector dx explicitly. For convenience, the baseline length is normalized to Unity. A sequence of m measurements from different times is concatenated together to form a matrix: of delta Cartesian positions, $$dX = [dx^{(1)} dx^{(2)} \ldots dx^{(m)}] - \overline{dX},$$

where $$\overline{dX} = \frac{1}{m}\left(\sum_{k=1}^{m} dx^{(k)}\right)[1\ 1\ \ldots\ 1].$$

The mean is subtracted such that dX represents deviations from a "nominal" baseline location. For small angle motion, the vectors $dx^{(k)}$ collectively define a plane which is normal to xo, the baseline vector. Ideally, the null space of $dX^T$ is exactly the previously unknown baseline vector (subject to a sign ambiguity).

Mathematically, the derivative of the length constraint $x^T x = 1$ is $2dx^T x = 0$. Therefore, $dx^T x = 0$. The presence of noise on the differential phase measurements effectively guarantees that dxT will be full rank. However, it is relatively straight forward to make an appropriate determination of the null space of a matrix by using the singular value decomposition or SVD. The matrix $dX^T$ is decomposed as $dxT = U\Sigma V^T$, where U and V are orthogonal matrices, and Z is a diagonal matrix of the singular values of $dX^T$ arranged in decreasing order. Based on the singular values of the resulting matrix one can establish criteria to define the rank of the matrix in the presence of measurement noise. The null space of the matrix is simply the last column of V (associated with the smallest singular value). the singular values can also be used to test for small angle motion.

An alternative method of achieving the same result is to form a "covariance matrix" $P = dxdX^T$ from the Cartesian measurements. The ellipsoids described by the equation $x^T P^{-1} x = \text{const}$ are an approximation for the shape of the collection of Cartesian data points. The best estimate of $X_0$ is then given by the eigenvalue of P associated with the smallest eigenvalue (the "flattest" dimension of an ellipsoid). This is equivalent to the null space solution of the SVD since the eigenvalues of P are the squares of the singular values of $dx^T$.

Several methods are now presented for extending this theme to multiple baselines and different types of motion. For clarity, it is assumed that all baselines are orthogonal to one another but the techniques are easily) generalized to arbitrary baseline configurations.

One could simply neglect the interconnection between the separate baselines and find the null space for each baseline individually. However this approach discards useful information. The idea behind the methods presented is to take advantage of the correlation among motion of separate baselines rigidly constrained to one another.

Null Space Method

With three orthogonal (non-coplanar baselines and small angle motion about 2 or three axes it is possible to unambiguously determine attitude in a single step. This method is founded on the orthogonality and length constraint equations of the three baselines, $$x1^T x2 = x1^T x3 = x2^T x3 = 0 \text{ and}$$

$$x1^T x1 = x2^T x2 = x3^T x3 = 1.$$

Taking the derivative of these equations and combining them into a single matrix equation, $$\begin{bmatrix} dX_2^T & 2dX_1^T 0 \\ dX_3^T & 0 & 2dX_1^T \\ 0 & dX_3^T & dX_2^T \\ 2dX_1^T 0 & 0 \\ 0 & 2dX_2^T 0 \\ 0 & 0 & 2dX_3^T \end{bmatrix} \begin{bmatrix} x_1 \\ x_2 \\ x_3 \end{bmatrix} = 0$$

Given the appropriate requisite motion the one dimensional matrix null space (the eigenaxis) exactly yields the three Cartesian vectors defining the three axis attitude. Applying the SVD this null space is most closely approximated by the ninth column of the V matrix.x.

After renormalizing the eigenaxis such that the magnitude of each vector is approximately unity the sign of the eigenaxis is resolved by imposing the correct "handedness" of the coordinate system. Were it not for measurement noise the matrix [x1 x2 x3] would be exactly the coordinate transformation from the body frame to the inertial frame. With measurement error, the elements will still be very close to forming an orthogonal set.

An equivalent formulation for two antennas is $$\begin{bmatrix} dX_2^T & 2dX_1^T \\ 2dX_1^T 0 \\ 0 & 2dX_2^T \end{bmatrix} \begin{bmatrix} x_1 \\ x_2 \\ x_3 \end{bmatrix} = 0.$$

However the sign ambiguity of the result must be resolved by other means.

Null Space Complement Method

The complement of the null space spanned by the Cartesian measurements is decomposed, instead of using the null space to resolve the attitude. For the sake of illustration, assume that two orthogonal baselines are employed:

$$[dX_2^T\ 2dX_1^T] \begin{bmatrix} x_1 \\ x_2 \\ x_3 \end{bmatrix} = 0.$$

The rationale behind this approach is that the cross terms in the "covariance matrix" such as $dX_1\ dX_2^T$, reveal the correlation among the measurements from different baselines. Once the subspace corresponding to attitude motion is found the next step is to further decompose the motion into components, especially about the baseline normal axis.

If the matrix is rank three, then there is sure to be a distinguishable motion about the axis normal to the baseline plane. The matrix V is partitioned as follows:

$$V = \begin{bmatrix} \dfrac{Q_2}{Q_1} & Q_{null} \end{bmatrix}$$

where $Q_1$ and $Q_2$ are both $\times 3$ matrices. The null space, Qnull, is discarded. Rotation along any of the axes represented in the data ma)x be formed with linear combinations, a, of the remaining columns:

$$\begin{bmatrix} dx_2 \\ dx_1 \end{bmatrix} \begin{bmatrix} Q_2 \\ Q_1 \end{bmatrix} a.$$

The problem is to determine which linear combination a of Ex and E corresponds to motion about the baseline normal. Rotation about the baseline normal axis is unique in that the displacement of each slave antenna is equally correlated with the other. However for each axis of rotation about any baseline the displacement of the other slave antenna is independent of the other. Therefore, the singular values of either Q1 or Q2 will take on values approximately 1, $$1/\sqrt{2},$$

, or 0, depending on whether the slave antenna motion is parallel to the baseline plane normal, about the baseline plane normal or non-existent respectively (corresponding to the motion of the other slave antenna).

With the SVD the matrix Q1 may be decomposed as $Q_1 = U_1 \Sigma_1 V_1^T$. The appropriate value of a is the column of $Q_1$ corresponding to the singular value nearest $$\frac{1}{\sqrt{2}}.$$

(Since V is orthogonal, the singular values of Q1 and Q2 are related by $\sigma_{Q1} = 1 - \sigma_{Q2}$.)

The resulting vector formed by $[dx_2^T dx_1^T]^T$ contains all the information (subject to a sign ambiguity) to piece together the three axis attitude of the platform.

Single Axis Rotation Solution

In cases where the platform is rotated through a small angle about a single axis there may still be candidate solutions available. The Cartesian displacement vectors $dx_1$ and $dx_2$ are measured at a single time from two baselines. Three regions are defined which indicate how much meaningful information arises from rotation about a given axis. The rotation axis in the inertial frame is given by the cross product of $dx_1$ and $dx_2$. One can solve analytically for the baseline vectors $x_1$ and $x_2$ matching the data and satisfying, $$x_1^T x_1 = 1, x_2^T x_2 = 1, \text{ and } x_1^T x_2 = 0.$$

With the rotation axis in a first region, the cross product is poorly defined and the rotation angle about the baseline plane becomes difficult to resolve. With the rotation axis in a second region, the baseline plane orientation is difficult to resolve although the angle of rotation about the baseline plane normal is easily resolved. In a third region, the complete three-axis attitude is resolvable, subject to a multiplicity of solutions. There are four possible solutions for every set of inputs. Therefore the three "image" solutions must be detected and discarded.

The cross product solution for two baselines can be generalized to any number and relative orientation of baselines. The directions of motion of each baseline must necessarily lie in the same plane for any rotation. Therefore the null space of the collection of dx measurements taken at a single time for all the baselines, $$\begin{bmatrix} dX_1^T \\ dX_2^T \\ \ldots \\ dX_m^T \end{bmatrix} = U\Sigma V^T$$

corresponds to the axis of rotation. Again, the singular value decomposition is used to find the null space.

Solution Refinement

Any mathematical formulation of rotation is inherently non-linear. Once initial guesses have been calculated based on the methods described above it is useful to iteratively refine the solution with a full non-linear model not only to weed out image solutions but also obtain the highest accuracy possible. Experimental testing of these techniques on actual receiver data indicates that integers can be resolved with just a few degrees of platform motion.

Bandwidth Performance

GPS differential phase measurements possess phenomenal potential for high bandwidth operation. The focus of this section is on differential phase tracking and the factors establishing the limits of performance. Experiments have been performed with signal processing loops that indicate potential bandwidth on the order of one KHz.

Differential Phase Tracking

The heart of a differential phase receiver is the signal processing loop. Carrier phase measurements are inherently noisy. Phase is represented by position along a circle. The carrier tracking error of the master antenna signal can be driven to zero while the phase of the slave antenna moves with respect to that of the master. The gaussian measurement noise is depicted both by error bars and a probability distribution function. By processing the raw measurements with an optimal estimator the bandwidth for sensing platform dynamics is maximized.

Such a loop architecture is described, for example, by Franklin, Powell, and Workman. The second order estimator is designed to estimate differential phase and phase rate. To derive maximum benefit from signal processing, the estimation loop also keeps track of integer wrap-arounds. Once the integers are known, the signal processor only needs to "hang on" to the differential phase during dynamics.

The tracking loop bandwidth is chosen based upon the expected platform dynamics. Then the optimal gain matrix L is calculated from the algebraic Ricatti equation. A machine code implementation of this filter on a 6809 microprocessor runs quite comfortably at a 1 KHz sampling rate. The experimental data includes both raw and filtered measurements. The differential phase rate of roughly three m/s corresponds to a formidable attitude rate even at baselines on the order of meters.

The GPS data bits hint at a key performance advantage of direct measurement of differential phase. In other forms of GPS operation the carrier tracking loop bandwidth cannot be easily set faster than the 50 bps data stream because the loop would begin to follow the 180 degree phase shifts of the data itself. This limitation does not apply to attitude determination because sign changes affect the carrier identically at each antenna.

This potential for high bandwidth operation also points to another key operational advantage. Since attitude may be decoupled from translation the tracking loop bandwidths for rotational and translational motion can be chosen independently to suit their respective dynamics.

High Performance Receiver Architecture

The performance capability of differential phase tracking naturally suggests a software architecture for computing the complete attitude solutions. In an architecture founded on integer tracking signal processors and high speed output rates, at start-up, the integer resolution block solves for the integer offset errors and corrects the signal processors accordingly. Once the integers are resolved attitude solutions are computed by the Kalman filter block.

High speed attitude solution output commensurate with the output rate of the signal processor is possible by linearizing the system about a nominal operating point. The vector z of filtered differential measurements may be expanded about the nominal attitude state vector, $x_0$, in terms of the linearized observation matrix, H:

$$z = z_0 + H(x - x_0).$$

Then, for attitudes near the nominal operating point the complete attitude solution can be expressed in terms of a pseudo-inverse matrix multiply:

$$x = x_0 + H^I(z - z_0), \text{ where } H^I = (H^T H)^{-1} H^T.$$

Thus the "fast" attitude output fills in for the Kalman filter block between its less frequent executions.

In FIG. 1, the error sources limiting performance are compiled into a single set of curves which collectively define the performance of GPS-based attitude determination. Label "A" represents a one meter surface vehicle, label "B" is for a one meter spacecraft/multipath calibration, and "C" is for a ten meter aircraft. Two limiting error sources are at the foundation of performance, (1) carrier-to-noise ratio, and (2) multipath. Each of these error sources is treated in terms of carrier tracking error (pointing error $\sigma_{74}$). The white noise on a reconstructed carrier dictates the differential range measurement error, $$\sigma_r = \sqrt{\frac{f_N}{C/N_o}} \frac{\lambda}{2\pi}.$$

whereby $f_N$ is the noise bandwidth of the carrier tracking loop and $C/N_o$ is the carrier-to-noise ratio.

Multipath error is conservatively modeled as a constant differential range error which is independent of the tracking loop bandwidth. Multipath is almost always a function of geometry. Therefore, it can be modulated by attitude motion. Empirical studies indicate that a value of $\sigma_r$, for a multipath of about five millimeters RMS (ten degrees of phase), is appropriate for difficult multipath environments (e.g., those rich in reflecting objects). The reduction of $\sigma_r$ occurring for slower dynamics is neglected.

The two error sources can be combined (as "RSS") to provide an estimate of the total differential phase tracking error. A conservative estimate will not take into account the improvement in accuracy from multiple measurements taken with additional base-lines and satellites. In a nominal performance curve along with the constituent multipath and $C/N_o$ lines, a crossover occurs at the noise bandwidth, where one or the other principal error sources dominates. A practical limit of bandwidth is imposed by the carrier loop lock threshold (see FIG. 1). Above this limit, the accuracy of the phase measurements is judged too poor to hold lock effectively. The multipath curve indicates the effect of antenna pattern shaping or multipath calibration on differential range measurement accuracy. If multipath error is reduced to 0.5 mm RMS (one degree of phase), the cross-over occurs at a lower noise bandwidth, resulting in superior accuracy.

SUMMARY OF THE PRESENT INVENTION

It is therefore an object of the present invention to provide a system for pointing a directional antenna quickly and efficiently.

Briefly, a preferred embodiment of the present invention is a system for automatically pointing a highly directional antenna. The system comprises two GPS antennas mounted at horizontally opposed extremities of the highly directional antenna, the placement is such that the GPS antennas lie on a line having a normal vector approximately parallel to a boresight of the highly directional antenna. The outputs from the GPS antennas are downconverted to a measurement frequency and differentially phase compared for each of a plurality of radio visible GPS satellites. A measurement controller receives the phase comparisons. A navigation computer receives measurements from the measurement controller and uses a microprocessor to calculate the GPS latitude and longitude and the attitude angles of the pair of GPS antennas. A servo points the highly directional antenna at a particular target communications satellite, based on the computed azimuth, elevation, latitude, and longitude, as provided by the navigation computer. One of these servos is used to move the GPS antennas in roughly a circle to average out multipath effects to improve accuracy and to reduce integer ambiguities.

An advantage of the present invention is that it provides faster antenna pointing than manual methods and therefore quicker availability of the communications channel.

Another advantage of the present invention is that untrained persons can successfully setup a mobile communications station.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a graph showing the error sources which limit performance when compiled into a single set of curves that collectively define the performance of GPS-based attitude determination;

FIG. 2A is a front view of a portable system according to an embodiment of the present invention;

FIG. 2B is a side view of the system of FIG. 2A and showing the suitcase enclosure is open and laid out flat, such as on the ground;

FIG. 2C is a top view of the system of FIGS. 1A and 1B and shows the azimuth direction of antenna rotation;

FIG. 3 is a block diagram of the antenna positioning system for the system of FIGS. 1A–1C;

FIG. 4 is a block diagram of the spur and worm gear, motor, and antenna position detection for either control axis of the system of FIG. 1;

FIG. 5 is a block diagram of the GPS receiver with the system of FIGS. 1A–1C; and FIGS. 6A and 6B are a flowchart of a computer-implemented process that runs on a microcomputer with the system of FIGS. 1A–1C.

DETAILED DESCRIPTION OF THE PREFERRED EMBODIMENTS

First Embodiment

A first embodiment of the present invention, in FIGS. 2A–2C, is a satellite communications system 10, according to an embodiment of the present invention, comprises a satellite parabolic dish antenna reflector 12 and feed 14, a pair of side mounted omni-directional GPS patch antennas 16 and 17, an elevation motor and gear assembly 18, a vertical support shaft 20, and a top case 22 and a bottom case 24 joined by a hinge 26. An azimuth motor and gear assembly 28 fits at the end of shaft 20 within bottom case 24. System 10 is transportable and dish assembly 12, 14, 16, and 18 can be taken off of shaft 20 and stowed away. The whole system can be closed inside cases 22 and 24 and carried like a suitcase with a handle. In an alternative embodiment, four corners of dish reflector 12 can notched to make it fit easier into cases 22 and 24. Dish assembly 12, 14, and 16 can be raised and lowered in elevation (FIG. 2B), and turned in azimuth (FIG. 2C). In an alternative embodiment, it can be spun along the longitudinal axis of feed 14 by setting the elevation to point upward and turning the azimuth such that patch antennas 16 and 17 will move in an orbit (FIG. 2A). In some instances, having only two GPS sensor antennas is a preferred configuration. It is possible, although mathematically more complex, to use only one GPS sensor antenna. Where cost is less of an object, and solution frequency is more important, three or more GPS sensor antennas will make the computational solution of pointing attitude less complex. This, of course, can reduce the demands on a computer used for this purpose, and help moderate the cost increase by allowing a less expensive computer to be used. If a deliberate motion of the GPS sensors can be introduced, then only one or two sensors are needed for good pointing. If no motion can be elicited, it is preferable to incorporate three or more sensors, although the inherent motion of the GPS satellites will eventually make up the deficiency if a 15–20 minute wait to collect more data from the new satellite positions is possible. For a spin motion, elevation can be set to 90° and the azimuth is adjusted to generate the spin. Additional drives to do this are avoided, because they can add to the cost significantly.

A parabolic dish antenna is in no way unique. It is the preferred type in those situations where frequency and gain considerations necessitate the choice. The use of a parabolic dish antenna herein is therefore merely an example of what can be used, and the present invention should not be construed as being limited to pointing any particular type of directional antenna.

An antenna positioning system 30, in FIG. 3, comprises a GPS attitude controller 32 that receives GPS data from a pair of patch antennas 16 and 17, and outputs motor drive signals to a pair of assemblies 18 and 28. (Antennas 16 and 17 are also referred to herein as sensors.) A phase difference occurs between antennas 16 and 17 (for a particular GPS satellite's signal) and is related to the angle between an imaginary line drawn between antennas 16 and 17 and the satellite. A zero phase difference indicates that the line connecting antennas 16 and 17 is normal to a line connecting the midpoint of the sensor axis. The boresight of the antenna being pointed is determined electrically and not mechanically. Empirical studies of each antenna's response to a satellite at a known position are made. The difference between the electrical boresight and the mechanical one is logged and used in a compensating servo pointing algorithm thereafter for that particular antenna. Since several GPS satellites in several points in the sky will typically be simultaneously receivable by antennas 16 and 17, so several phase differences can be collected. One for each satellite. The determination of a GPS satellite's position from its signals and the position of a GPS receiver is conventional. Controller 32 additionally uses the collected phase differences to determine the physical attitude of the line connecting antennas 16 and 17. A technique for doing this is summarized in the paper, mentioned above, by Clark E. Cohen and Bradford W. Parkinson. In addition, spinning the dish assembly can help to determine the attitude of the plane in which antennas 16 and 17 orbit more accurately by causing a spatial averaging of multipath errors and by removing integer cycle phase ambiguities with a higher probability of correct results than would be obtained without spin.

Cohen, et al., point out that multipath signals can reach interference levels that are great enough to prevent an attitude solution. Therefore, controller 28 moves antennas 16 and 17 to several different points, by directing the elevation drive 18 to point approximately vertical and the azimuth drive 28 to then turn around to collect several sets of relative phase data. The multipath at these other points may be low enough to allow attitude solutions. A solution is determined for each set of readings and then a final solution can be computed from the average of the solutions. In effect, the multipath distortions introduced are self-cancelled, and only the true attitude of the antenna assembly remains.

A prior art "method and apparatus for precision attitude determination and kinematic positioning" is described in U.S. Pat. No. 4,963,889, issued Oct. 16, 1990, to Hatch. The Hatch method comprises, for example, the steps of:

determining the approximate initial relative position of a secondary antenna that is freely movable with respect to a reference antenna;

making carrier phase measurements based on the reception of a plurality N of satellites, where N is the minimum number of satellites needed to compute the relative position of the secondary antenna;

deriving from the carrier phase measurements an initial set of potential solutions for the relative position, wherein the initial set of potential solutions all fall within a region of uncertainty defined by a sphere having a radius equal to the maximum distance between the two antennas, and wherein multiple potential solutions arise because of whole-cycle ambiguity of the carrier signal;

making redundant carrier phase measurements based on the reception of a carrier signal from an additional (N+1)th satellite; and eliminating false solutions from the initial set of potential solutions, based on a comparison of the redundant carrier phase measurements with the initial set of potential solutions, to reduce number of potential solutions to close to one, whereby the number of potential solutions is not increased by use of the redundant carrier phase measurements.

The phrase, "deriving from the carrier phase measurements an initial set of potential solutions," means deriving the initial set from two satellites. Circular intersections of wave fronts are formed from the two satellites, obtaining a collection of concentric circles. The intersection points of these circles and a sphere are solved for. But, given only two satellites, there is no other way to form an initial set of potential antenna positions. For the example, on page 12, line 35 of Hatch, there are 188 points or potential solutions in the initial set. The phrase "eliminating false solutions from the initial set of potential solutions," means It eliminating 187 of those 188 points. The idea of potential solutions refers to the initial set of 188 points.

A primary technical obstacle is the rapid resolution of integer ambiguities in measured GPS carrier phase data. The cause of integer ambiguity is the difficulty in determining the integer number of carrier cycles that occur between the antennas and the cable paths. For example, a single carrier intersects two antennas. The phase angle at the first antenna is zero degrees, and the phase angle at the second antenna is 72 degrees. There may, however, be an additional full cycle between the antennas. As the signals travel their respective paths from the antennas to a pair of correlators, additional phase shifts appear. If the first antenna cable path is 3.6 wavelengths, and the second is 0.8 wavelengths, the correlator connected to the first antenna sees a signal sin ($\omega t - 1296$ degrees), while the correlator connected to the second antenna sees a signal sin ($\omega t + 72 + 360 - 288$ degrees). The signal correlators measure the first-difference carrier phase, the phasor difference between the signals seen at a channel one and a channel two correlator inputs. For this example, the basic output is a phase measurement of 288 degrees, or 0.8 wavelengths.

A preferred method of determining an attitude to a GPS satellite comprises the steps of:
  making carrier phase measurements based on the reception of a plurality of satellites, such that each of the phase measurements has added a range of possible integer values (due to the whole-cycle ambiguity of the carrier signal);
  forming a decision tree expressing each of the possible combinations of integers;
  computing a weighted-fit error at one or more stages of the tree, such that a determination is made that none of the integer combinations connected to the current branch of the tree can be optimum and the current branch may accordingly be cut, speeding up the search; and
  selecting a final integer combination on the basis of the best fit with the measured phase data, as indicated its weighted-fit error.

This preferred method differs from Hatch in that the direct integer search algorithm is based on a fundamentally different principle of operation. The approach here is to view the vehicle attitude and the integers as unknown parameters to be adjusted so as to maximize the probability of the phase measurements actually generated by the hardware. It can consider 10,000 possible integer combinations, and effectively evaluate them all with an efficient algorithm, which accomplishes exactly the same result as would be obtained if all the thousands of integer combinations were evaluated directly, one after another, looking for the one optimum combination or best fit with the data. Hatch takes two satellites and generates about 188 possible solutions, using only two satellites, and then culls from that set using redundant satellite information. The 188 computation results will be perturbed by phase measurement error and do not represent actual antenna locations. The computational sensitivity to noise is especially great at locations where the carrier wavefronts just graze or almost graze the sphere, where a two degree phase error can produce 4.6 centimeters of antenna location error (for a one meter baseline). Hatch's method is deterministic in nature, as seen from the choice of the first two satellites. Rather than choose the two satellites most nearly at right angles (to minimize noise sensitivity), Hatch teaches the opposite. Choosing the two satellites closest together, so as to reduce the initial set to something less than 188 points. Hatch teaches (at column 8, lines 59-64) that the approach in the above preferred method may not produce the desired results,". . . if ten different whole-cycle values can be added to the first references from each of the four satellites, then one might expect $10^4$ or 10,000 possible solutions within the uncertainty region. . . . Indeed, some authors have defined the number of possible acceptable solutions in exactly this fashion." The above preferred method will work with up to forty degrees RMS phase measurement error, meaning that the $3\sigma$ phase error is 120 degrees, and peak-to-peak error is $\frac{2}{3}$ wavelengths. At forty degrees RMS, $\pm 6\sigma$ bounds encompasses a range of 480 degrees, or 4/3 wavelengths. If those same assumptions are applied to Hatch's algorithm as thresholds for eliminating points, then none of the 188 points are eliminated, no matter how many satellites are available for comparison. Disregarding each potential solution for which the closest wavefront from the additional satellite is placed from the potential solution by more than a selected threshold indicates that that phase measurement errors larger than 2-4 degrees RMS are not anticipated. RMS phase measurement errors of twelve degrees have been found to be typical, for which the $\pm 6\sigma$ threshold would encompass 0.4 wavelengths. After the application of third and fourth satellites, there would be $188 \times 0.4 \times 0.4 = 30$ candidate points remaining. Not the single candidate hoped for. To get a single candidate on average, the phase error level would have to be 2.19 degrees RMS; the $\pm 6\sigma$ threshold would then encompass 26.3 degrees, or 0.073 wavelengths. Then, $188 \times 0.073 \times 0.073 = 1$. Using $\pm 3\sigma$ in place of $\pm 6\sigma$ thresholds would allow a doubling of 2.19 degrees to 4.4 degrees RMS. But 1% of the time the right solution would be eliminated due to noise, risking selecting any other false solution if it happened to be the only one that got through. A "no-solution" rate of 1% might be acceptable, but a 1% error rate is intolerable. The large multipath experienced in practice apparently was not anticipated, line variation errors have been found to be forty degrees. This is not apparently considered as a source of error by Hatch. An important element is missing from Hatch in his direct integer search algorithm. There is no initial set.

Preferably, a maximum likelihood estimation (MLE) optimum solution over the full range of integers and vehicle attitudes is accomplished efficiently. There can be thousands of possible integer combinations with antenna separations on the order of a meter, with two antenna baselines, and with three to six satellites. Preferred methods find the one-and-only optimum integer combination and associated vehicle attitude out of all possible integers and attitudes. The problem is formulated as a maximum likelihood estimation (MLE) optimization, where vehicle attitude and the integers are regarded as unknown parameters to be adjusted in order to maximize the probability of the first-difference carrier phase measurements that are actually generated in the hardware. That formulation results in weighted-fit error W, as the objective criterion to minimize. A Kalman filter is introduced, having the same objective criterion. Avoiding unnecessary computation in the Kalman filter leads to a decision tree for the integers. A nested loop is devised that implements the tree, produces all the integer combinations, and merges the optimization over vehicle attitude with the optimization over integers. Two ways are then introduced to "prune" the tree, cutting off entire branches at points where it can be guaranteed that all integer combinations further down the same branch are not optimum. The first way is to exclude impossible combinations, such as those that produce an antenna upside down. The second is to generate a lower bound for W at each branch of the tree.

In FIG. 4, elevation motor and gear assembly 18 comprises a DC servo motor 40, a worm gear 42, a spur gear 44, a shaft positioning encoder plate 46, a shaft position detector 48, and a shaft position transmitter 50. The shaft position detector 48 and shaft position transmitter 50 constitute a clinometer. Assembly 28 is similar to assembly 18. A motor and gear assembly to spin the dish antenna (FIG. 2A) would also be similar to assembly 18. And gear backlash must be kept to a minimum, if pointing accuracies of two milliradians are to be maintained. An acceptable set of gears is available from Cone Drive (Traverse City, Mich.), e.g., 50:1 R.H. helix special, drawing 54280–310.

Table I summarizes the effects of changing the number of GPS antennas and whether or not these antennas can be moved or are moving.

TABLE I

| No. of GPS Ants. | Motion ? | Unique Attitude Solution: How Well Are Integer Ambiguities Resolved? | Solution Accuracy: How Well is Multipath Noise Removed? |
|---|---|---|---|
| 1 | no | Cannot Get An Attitude Solution | Cannot Get An Attitude Solution |
| 1 | yes | Antenna Motion: Attitude Solution Is Determined Entirely By The Motion Path, If Motion Is Not Planar, Indeterminate Axis Is Present | Antenna Motion Can Do a Good Job |
| 2 | no | Wait For GPS Satellites to Move Across the Sky. Then Only One Axis is Determined by Two Sensors. Takes 15-30 Minutes. | Satellite Motion Helps Some. |
| 2 | yes | Spin The Sensors About a Roughly Perpendicular Axis. Solution is Guaranteed. | Spin Does a Good Job. |
| 3 | no | Solution is Highly Probable. | Satellite Motion Helpful if 15-30 Minutes Available. |
| 3 | yes | Unique Solution Guaranteed. | Antenna Motion Does a Good Job. |
| 4+ | no | Motion is not Required to Get a Fast and Unique Solution. But the More Antennas, the Better the System Works, and the Less Noise the Solutions Will Have. | |
| 4+ | yes | Best Combination. | Best Combination. |

If the antenna platform (to which the antenna to be pointed) is not moving with respect to a target, then a solution is required only once, since additional solutions would only be redundant. This case can be satisfied by either having two GPS antennas or at least one that has motion.

If the antenna platform is moving, then antenna pointing solutions must be continuously determined. This latter case requires at least three GPS antennas be used. Larger, even uncontrolled platform motion can help in getting better pointing solutions, compared to no motion at all. One antenna cannot be used unless planar motion can be guaranteed. Two antennas require that a substantial component of motion about the normal axis be guaranteed.

In any case, the GPS sensor antennas must be sufficient in number and positional diversity to keep as many GPS satellites in view as possible for the period of time pointing solutions are needed.

Second Embodiment

A second embodiment of the present invention is similar to the first embodiment and is a transportable satellite communications device, comprising at least two Global Positioning System (GPS) antennas for attachment to a parabolic dish antenna capable of communicating with a satellite from the ground. A GPS receiver is coupled to the GPS antennas. An attitude means for rotating the GPS antennas about an approximately vertical axis such that a set of GPS physical parameters can be determined and GPS multipath errors can be averaged out. The attitude means having means for outputting solutions, and means for positioning the parabolic dish antenna responsive to solutions from the attitude means.

Data available from previous solutions is used to minimize the time for output solutions from the attitude means. To assure that the GPS sensors can see as many GPS satellites as possible in any direction, the vertical axis of rotation should be within 20° of true vertical. The attitude means is such that once full output solutions have been determined the rotational motion and orientation are not used for assisting solutions and pointing solutions unless a restart command is received from an external controller.

In FIG. 5, a GPS receiver 80, contained within GPS attitude controller 32, comprises a radio frequency (RF) switch 82 to multiplex-in signals from GPS antennas 16 and 17, a downconverter 84 to receive a selected GPS signal from the RF switch 82, a phase measurement unit 86 to receive a modulation signal from the downconverter 84, a controller and navigation computer 88 in communication with the phase measurement unit 86, a crystal oscillator (XTAL) 90, and a frequency synthesizer driven 92 by a signal from the XTAL 90 and outputs a first frequency F1 to the downconverter and a second frequency F2 to the phase measurement unit. In an alternative, more complex embodiment, a downconverter may be provided for each GPS antenna.

FIGS. 6A and 6B are a flow chart for a computer implemented process 100 which is executed by computer 88 (FIG. 5). Process 100 comprises a step 102 that senses a power-up condition. A step 104 initializes GPS, assumes the velocity of system 10 is zero, and checks circuits. A step 105 issues a GPS acquisition failure message if appropriate. A step 106 selects one of the GPS antennas 16 or 17. A step 108 acquires GPS data and computes a latitude and a longitude solution, and then stores the solutions in memory. A step 110 determines if acquiring the GPS data and computing a latitude and longitude solution were successful. If not, repeating the acquiring of GPS data by looping back to step 108 after first testing in a step 112 for a timeout. If a timeout has occurred, flow causes a step 114 to issue a failure message. A step 116 determines if a second GPS antenna is available to be selected, and if so, selecting it. If not, a step 118 loads a data buffer and sets a data available flag and then a step 120 sends a message that there is only one GPS antenna. A step 122 increases the elevation of parabolic dish antenna 12 to 90° and its azimuth to a predetermined index and then waits. A step 124 reads incoming messages from a step 126 to see if a rotation failed message is waiting. A step 128 branches if the rotation was not OK, otherwise a step 130 reads incoming messages from a step 132 to collect position information. A step 134 determines if the parabolic dish antenna 12 position is acceptable. A step 136 resets a pair of azimuth and elevation counters and a measurement index counter to zero. A step 138 sends a message that azimuth and elevation are reset. (Follow connector "A" to FIG. 6B.) A step 140 resets azimuth and a step 142 sends a message that the azimuth has been reset. A loop is set up by the index counter and a step 144 looks to see if the index is still under thirty-two. If so, a step 146 moves the azimuth to maximum (e.g., 180°) and a step 148 sends a message to that effect. A step 150 reads incoming messages from a step 152, especially a message concerning the current azimuth. A step 154 tests to see if the azimuth is maximum, and if not, loops back to step 150 to wait for the azimuth move. A step 156 measures antennas A and B and stores the readings. A step 158 attempts to compute the antenna's physical pointing attitude from the data thus far collected and stored. A step 160 tests to see if the computations in step 158 were successful, and if not, a step 162 sends the message that the attitude computation has failed and returns via a connector "B" to the beginning of process 100 (FIG. 6A). If the computations were successful, a step 164 loads a data buffer with the solution(s) and a step 166 outputs in a message the results. A step 168 then does a continuous timing measurement loop with periodic messages issuing via a step 170. If the system 10 is stationary, no new pointing solutions will be needed, because the three dimensional relationships with the communications satellite will not change. (Many communications satellites are in geostationary orbits.) From step 162 through connector "B", control returns to FIG. 6A where incoming messages, such as a restart message at a step 172 are read-in by a step 174. A step 176 tests to see if the user is requiring a reset (as indicated in the incoming messages) and process 100 returns control to 104 when a restart message is received and recognized.

The parabolic dish antenna positioning means comprises worm gear and motor assemblies that enable the parabolic dish antenna to be positioned at least ±180° in azimuth and at least 0° to 90° in elevation. The worm gear and motor assemblies are resistant to torque caused by wind on the parabolic dish antenna. The worm gear and motor assemblies can position and hold the parabolic dish antenna to an accuracy of at least two milliradians.

Third Embodiment

In FIG. 7, a third embodiment of the present invention is a portable ultra-high frequency (UHF) satellite communications (SATCOM) antenna system 200 comprising a directional UHF antenna 202 having a main boom 204 and a plurality of whisker elements 206, a pair of GPS sensor antennas 208 and 210 one each mounted at opposite ends of a perpendicular boom to the UHF antenna boom 204, an elevation drive 212, and an azimuth drive 214. System 200 mounts on an antenna platform 216. For example, the UHF antenna 202 can be a Dorne & Margolin (Bohemia, N.Y.) DM C152 Antenna, which has an 80° 3 dB beam width and operates within 244–318 MHz. Even at an 80° beam width, the UHF antenna 202 needs constant or near constant pointing in the field when in use, especially when platform 216 is mounted on a ship, military tank, or other moving vehicle. Automatic, as opposed to manual pointing is preferable in many situations. Table I indicates that an attitude solution will be guaranteed for the axis of the beam, since the system will be moving and will help the determination of the solutions. The placement of GPS antennas 208 and 210 is such that they lie on a line having a normal vector approximately parallel to a boresight 218 of the highly directional antenna.

Outputs from GPS antennas 208 and 210 must be downconverterted to a measurement frequency. A unit that can do this and the later described functions is GPS receiver 80 (FIG. 5). The downconverted signals are differentially phase compared for each of a plurality of radio visible GPS satellites. A measurement controller receives the phase comparisons. A navigation computer receives measurements from the measurement controller and comprises a microprocessor which can calculate the GPS latitude and longitude and the attitude angles of the of GPS antenna pair. It has servo means for pointing antenna 202 at a particular satellite, based on its azimuth, elevation, latitude, and longitude, as provided by the navigation computer. A clinometer can be mounted to directional antenna 202 such that elevation angles of the boresight 218 can be measured and output as a clinometer elevation angle. Obviously, a means should be included for the navigation computer to use the clinometer elevation angle to reduce the number unknown quantities to be calculated. A clinometer is not strictly required for the present embodiments of the present invention. The usefulness of a clinometer should be weighed against the cost. A servo or servo program connected to drives 212 and 214 to move directional antenna 202 (and the GPS sensors) through a particular pattern would reduce the computational load on the system. A program and extra calculation ability in, for example computer 88, to use data gathered while moving through the particular pattern will also reduce the number unknown quantities to be calculated. A program that waits for radio visible GPS satellites to move with respect to the antennas can help produce better attitude solutions, by reducing the number unknown quantities to be calculated.

Fourth Embodiment

A fourth embodiment of the present invention is a system 300 (not shown) comprising a third GPS antenna, compared to system 10, such that three GPS antennas are distributed about a plane having a normal vector approximately parallel to a boresight of a highly directional antenna. FIGS. 2A-2C and 3-5 show what this system would look like, except that three GPS sensors would be placed around the rim of dish 12. Navigation computer 88 comprises a program to use data gathered from all three GPS antennas. So moving the directional antenna 12, or 202 (FIG. 7), is not needed to arrive at a pointing solution.

A means to stabilize the system can be helpful so that it will resist being rocked or titled during operation. For example, the stabilizing means can comprise stakes that can be driven into the ground to anchor the system. In such a non-mobile installation, three GPS antennas are not strictly necessary.

Fifth Embodiment

A fifth embodiment of the present invention is a system 400 (not shown) that comprises a pair of first and second GPS antennas (such as antennas 16 and 17) that are mounted at horizontally opposed extremities of a parabolic dish antenna, such as dish 12 in FIGS. 2A-2C. In the fifth embodiment, the GPS sensors are detachable, so that a pointed antenna can be left behind and a new one needing point can be attended to with the system. So with the exception of having the antenna assembly 12-20 mount to the case 24, this embodiment is substantially the same as system 10. The placement such that the GPS antennas lie on a line having a normal vector approximately parallel to a boresight of the directional antenna.

Sixth Embodiment

A sixth embodiment of the present invention is a system 500 (not shown) that differs from system 200 (FIG. 7) in that a gyro 502 is attached to boom 204 and has at least one GPS antenna (such as 208 or 210) mounted in a multiplicity of non-colinear positions on platform 216, instead of boom 204. A second gyro (not shown) mounted on platform 216 can supplement or replace gyro 502. The gyro(s) sense short-term (fast) motion. A conventional servo means can be employed to receive signals from gyro 502 and to move antenna 202 to maintain its pointing direction while the platform 216 is in motion. This would remove the pressure on a GPS attitude computer to provide constant updates to the attitude solution. The amount the drive motion moves antenna 202 is preferred to enable a proportional-integral-differentiatial (PID) controller to use GPS signals for long-term motion corrections and gyros signals for short-term corrections. The system 500 is especially useful in a high-dynamic environment in which the antenna platform 216 is subject to significant acceleration, such as a military tank or jet fighter.

Seventh Embodiment

A seventh embodiment of the present invention, shown in FIG. 8, is a system 600 with a plurality of GPS antennas 602 mounted such that any three are not collinear on a platform 604 (or object such as a ship) to which a communication (or other type) antenna 606 is mounted. The system 600 further comprises a servo means 608 for moving the antenna 606 to maintain its pointing direction while the platform 604 is in motion, a sensing means 610 to determine the amount of antenna drive motion, a navigational computer 612 able to use GPS measurements at a very high rate and sufficient to provide pointing corrections frequent enough to maintain the pointing accuracy of antenna 606. Computer 612 comprises a multiplexer (not shown) to allow the use of the several GPS antennas 602 near simultaneously to resolve any phase cycle count ambiguities in real-time. Alternatively, the multiplexer may be reduced or replaced by a multiplicity of parallel GPS receivers. The navigational computer 612 has a very heavy computational load and more GPS sensors 602 than shown in FIG. 8 may be needed to make up for the saving lost by eliminating gyros, (e.g., gyro 502). The increased computational demands may be tolerable, since the elimination of gyros from system 600 results in an elimination of a high failure rate item that can be the cause of a complete system failure.

Although the present invention has been described in terms of the presently preferred embodiments, it is to be understood that the disclosure is not to be interpreted as limiting. The term "directional antenna" has been used herein and is intended to comprise antennas of the following types: wire and loop, waveguide horn, waveguide slot array, periodic array, phased array, aperiodic array, microstrip, log spiral and spiral conical, and helical. Other antenna types not mentioned here, are also directional, and can benefit from being combined in systems embracing the present invention. Various further alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A communications system, comprising:
   a directional antenna supported by a mobile platform subject to continuous irregular motion;
   a plurality of GPS patch antennas mounted non-collinearly apart from one another and attached to said mobile platform at points where said platform shadows the GPS antennas from GPS satellite visibility to a minimum extent;
   attitude determination means including maximum likelihood estimations (MLE) optimization means for resolving integer ambiguities and multiplexing means for coupling all of the GPS patch antennas into a single GPS receiver downconverter for calculating a platform attitude based on the phases of a plurality of GPS signals received by the GPS patch antennas from at least three GPS satellites; and
   servo means mechanically connected to the directional antenna and for automatically positioning the directional antenna according to a pointing direction obtained by the attitude determination means wherein a radio communication may be established.

2. The system of claim 1 wherein:
   the attitude determination means and said MLE optimization means further comprise:
   means for collecting a plurality of carrier phase measurements from the GPS patch antennas based on a reception of GPS signals from a plurality of GPS satellites such that each of said carrier phase measurements adds a range of possible integer values according to the whole-cycle ambiguity of a GPS carrier signal;
   means for forming a decision tree expressing each of said possible combinations of said possible integer values;
   means for computing a weighted-fit error at one or more stages of said decision tree, such that a determination may be made that none of said integer combinations connected to a current branch of the tree can be optimum and said current branch may accordingly be cut thereby speeding up a search through said decision tree; and means for selecting a final integer combination on the basis of a best fit with said measured phase data, as indicated by its weighted-fit error.

3. A portable satellite communications system including automatic antenna pointing for rapid field setup by relatively unskilled operators, the system comprising:

a portable carrying case;

a parabolic dish antenna supported by the portable carrying case for satellite communications with a communications satellite;

a pair of GPS patch antennas mounted apart from one another on the parabolic dish antenna;

attitude determination means for calculating a pointing direction for the parabolic dish antenna to said communications satellite with a known orbital position base on GPS carrier signals received by the GPS patch antennas from a GPS satellite that is apart from said communications satellite and that is based on an earth position derived for the GPS patch antennas from information included in said GPS signals;

servo means for automatically positioning the parabolic dish antenna according to a result obtained by the attitude determination means such that a radio communication may be established between said communications satellite and the parabolic dish antenna; and multipath interference reduction means for improving an attitude solution result and including sampling means for moving the parabolic dish antenna for collecting several sets of the relative GPS signal phase data by the pair of GPS patch antennas and for use by the attitude determination means to calculate an ultimate pointing direction.

4. A portable satellite communications system including automatic antenna pointing for rapid field setup by relatively unskilled operators, the system comprising:

a portable carrying case;

a parabolic dish antenna supported by the portable carrying case for satellite communications with a communications satellite;

a pair of GPS patch antennas mounted apart from one another on the parabolic dish antenna;

attitude determination means for calculating a pointing direction for the parabolic dish antenna to said communications satellite with a known orbital position based on GPS carrier signals received by the GPS patch antennas from a GPS satellite that is apart from said communications satellite and that is based on an earth position derived for the GPS patch antennas from information included in said GPS signals, and comprises maximum likelihood estimation (MLE) integer resolution means for:

collecting a plurality of carrier phase measurements from the GPS patch antennas based on a reception of a plurality of GPS satellites such that each of said carrier phase measurements can add a range of possible integer values according to the whole-cycle ambiguity of a GPS carrier signal;

forming a decision tree expressing each of said possible combinations of said integer values;

computing a weighted-fit error at one or more stages of said decision tree, such that a determination may be made that none of said integer combinations connected to a current branch of the tree can be optimum and said current branch may accordingly be cut thereby speeding up a search through said decision tree; and selecting a final integer combination on the basis of a best fit with said measured phase data, as indicated by its weighted-fit error; and servo means for automatically positioning the parabolic dish antenna according to a result obtained by the attitude determination means such that a radio communication may be established between said communications satellite and the parabolic dish antenna.

5. The system of claim 4, further comprising:

motor means for spinning the parabolic dish antenna such that the GPS patch antennas may collect a plurality of GPS signals for the attitude determination means such that a three-dimensional pointing solution may be obtained for application to the servo means.

6. The system of claim 4, further comprising:

at least one additional GPS patch antenna attached to the parabolic dish antenna such that at least three GPS patch antennas are included in a collection of a plurality of GPS signals for the attitude determination means such that a three-dimensional pointing solution may be obtained for application to the servo means.

7. The system of claim 4, further comprising:

at least one additional GPS patch antenna attached to the parabolic dish antenna and coupled to the attitude determination means; and motor means for spinning the parabolic dish antenna such that at least three GPS patch antennas are included in collecting a plurality of GPS signals for the attitude determination means wherein a unique three-dimensional pointing solution may be obtained for application to the servo means.

8. The system of claim 4, further comprising:

data storage means for saving a previous pointing solution for use by the attitude determination means such that the time to compute a current pointing solution is reduced by recalling said saved previous pointing solution.

9. The system of claim 4, further comprising:

multiplexer means for multiplexing said GPS signals from the GPS patch antennas to the attitude determination means which includes a single downconverter for all GPS carrier phase measurements.

10. A satellite communications system, comprising:

a platform subject to continuous motion while the system is in operation;

a directional dish antenna supported by the platform for satellite communications with a communications satellite;

a set of three of GPS patch antennas non-colinearly mounted apart from one another on the directional dish antenna and having a known geometric relationship to the directional dish antenna;

continuous attitude determination means for calculating a series of pointing directions for the directional antenna from a GPS satellite that is apart from said communications satellite and that is based on an earth position derived for the GPS patch antennas from information included in said GPS signals;

servo means mounted on the platform for automatically positioning the parabolic dish antenna with respect to the platform according to a result obtained by the attitude determination means to establish a radio communication between a communications satellite and the parabolic dish antenna;

multipath interference reduction means for improving an attitude solution result and including sampling means for moving the parabolic dish antenna to collect several sets of relative GPS signal phase data by the pair of GPS patch antennas and for use by the attitude determination means to calculate an ultimate pointing direction; and maximum likelihood estimation (MLE) integer resolution means for:

collecting a plurality of carrier phase measurements from the GPS patch antennas based on a reception of a plurality of GPS satellites such that each of said carrier phase measurements adds a range of possible integer values according to the whole-cycle ambiguity of a GPS carrier signal;

forming a decision tree expressing each of said possible combinations of said integer values;

computing a weighted-fit error at one or more stages of said decision tree, and determining that none of said integer combinations connected to a current branch of the tree are optimum and said current branch may accordingly be cut thereby speeding up a search through said decision tree; and selecting a final integer combination on the basis of a best fit with said measured phase data, as indicated by its weighted-fit error.

* * * * *